Figure 1:
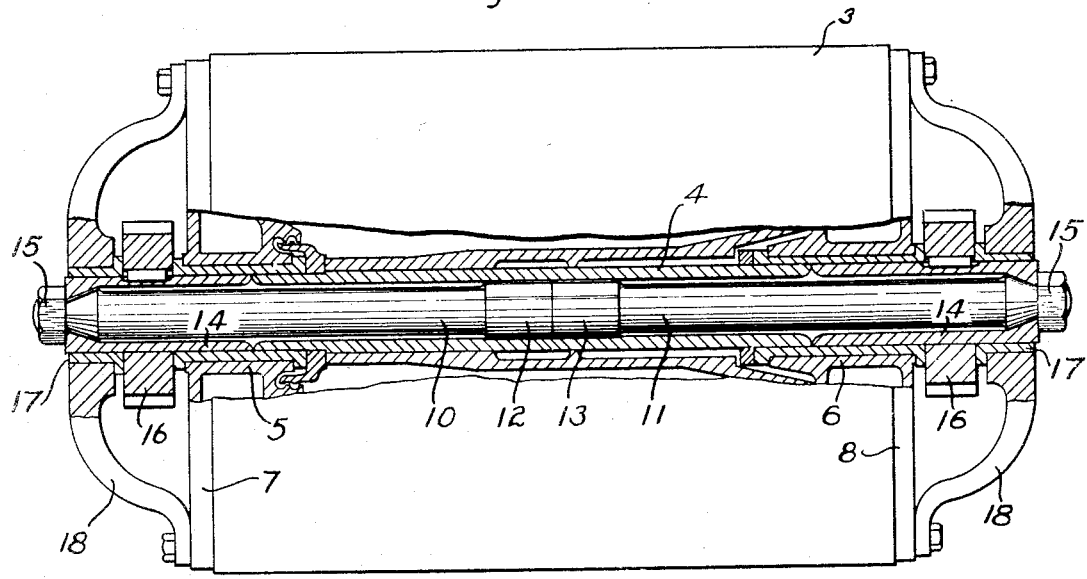

Sept. 2, 1924.  
G. M. EATON  
1,506,739  
RESILIENT DRIVING CONNECTION

Filed May 11, 1921

WITNESSES:  
L. F. Sonnemann  
A. Martin

INVENTOR  
George M. Eaton.  
BY  
Wesley G. Carr  
ATTORNEY

Patented Sept. 2, 1924.

1,506,739

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

Application filed May 11, 1921. Serial No. 468,596.

*To all whom it may concern:*

Be it known that I, GEORGE M. EATON, a citizen of the United States, and a resident of Pittsburgh, in the county of Allegheny and State of Pennsylvania, have invented a new and useful Improvement in Resilient Driving Connections, of which the following is a specification.

My invention relates to resilient driving connections and particularly to flexible shafts.

One of the objects of my invention is to provide a flexible shaft, through which power may be transmitted from a driving member to a driven member, of such character that shock or jars incident to the operation of the mechanism or relative irregularities of movement therebetween will be absorbed or compensated for.

A further object of my invention is to combine, with a flexible shaft, means for supporting it against bending strains without effecting its resilience.

My invention is specially applicable in connection with electric drives wherein the motor, through its shaft and a pinion thereon, drives a gear. In such constructions, any irregularity of tooth formation, in either the gear or the pinion, subjects the armature of the motor to shocks, and, in cases where there are pinions on both ends of the shaft that drive rigidly-connected gears, any irregularities in tooth formation tend to seriously injure the teeth and to cause undue strains upon the mechanism associated with the gears and pinions. The shaft, by reason of its flexibility, will also adjust itself to disalinement of its bearings.

Furthermore, in the case of alternating-current motors, the vibration caused by the alternations of the current is frequently transmitted to the driven apparatus, and, when the frequency of the alternating current is low, the vibrations thus transmitted are quite likely to be highly objectionable.

The driving connections of railway motors are also subject to strains by reason of irregularities in the track.

While flexible shafts have heretofore been employed in drives of a similar character, such shafts have been objectionable in that, if made sufficiently flexible, they would not withstand heavy bending stresses, and provision against bending has sometimes been obtained at the expense of resilience.

Stated generally, my invention contemplates the provision of a shaft of spring steel provided with bearings adjacent to its ends. The shaft extends beyond these bearings distances sufficient to permit pinions to be secured thereon, and auxiliary bearings are provided to support the extreme outer ends of the shaft against bending strains that may be imparted thereto through the pinions.

Figure 2:
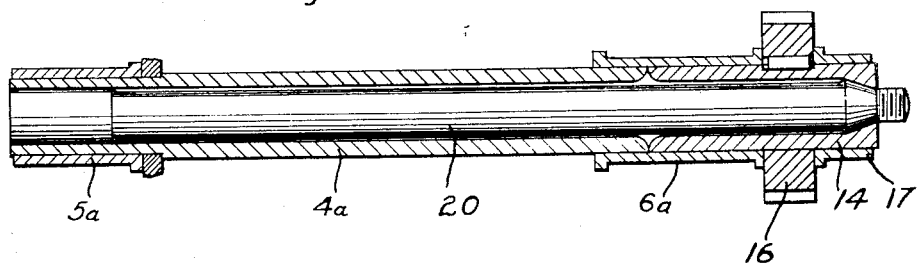

As shown in the accompanying drawing:

Figure 1 is a view, in longitudinal section, of a portion of a machine embodying my invention and Fig. 2 is a modified form of shaft construction.

My invention is shown as applied to a railway motor 3 that is provided with a hollow armature shaft or sleeve 4 which is supported in bearings 5 and 6 that are carried by the end plates or brackets 7 and 8, respectively, of the motor casing.

Shaft members 10 and 11, of spring steel or similar resilient material, are provided with enlarged portions 12 and 13, respectively, that have a press fit within the hollow shaft 4.

The outer ends of the shaft sections 10 and 11 are provided with sleeve members 14 that are also supported by the bearings 5 and 6. The sleeve members 14 are rigidly secured to the shaft sections 10 and 11 by means of nuts 15 that are screwed upon the threaded ends of the shaft sections, to draw the tapered portions against the corresponding faces of the sleeve members 14. Pinions 16 are keyed to the sleeve members 14.

Bearing members 17 are provided for those portions of the sleeve member 14 that extend beyond the pinions 16, and bracket members 18 are screwed or bolted to the end plates 7 and 8 of the motor casing and serve to support the bearings 17.

From the foregoing, it will be seen that rotation by the armature shaft 4 will drive the pinions 16, and that, since the shaft sections 10 and 11 are made of spring steel, the driving connection will be of a yielding or resilient character. It will further be clear that the outer bearing 17 and the sleeve members 14 will serve to relieve the sections 10 and 11 from the bending stresses that would ordinarily be imposed thereon through the pinions 16. The flexible shaft is, therefore, subject to substantially no stresses except torsional ones.

It will be apparent that the pinions 16 are flexibly connected to each other and are also flexibly connected to the sleeve or motor shaft 4.

The former feature is important in cases where the respective pinions have driving connections to a pair of rigidly connected gears, in that irregularities of tooth engagement between the gear and pinion at one end will not result in undue stresses either upon such members directly or upon the driving connections at the opposite ends of the shaft.

In Fig. 2, I have shown a construction of a form that may be employed in those cases wherein it is desired to drive only a single pinion. In this device, the armature shaft 4ª is made of substantially greater length than that shown in Fig. 1, and the flexible shaft 20 is pressed into the armature shaft 4ª at the extreme end of such shaft. The armature shaft is supported, at its one end, by bearing 5ª and at its other end by a bearing 6ª. The sleeve member 14 supports a pinion 16 and is, in turn, supported by a bearing 17, in the manner above described for each end of the shaft sections 10 and 11.

In this modified form of construction, the motor shaft 4ª has a flexible driving connection to the pinion 16, as above described with respect to Fig. 1, and the flexible shaft 20 is also supported against bending stresses.

Various modifications may be made in details and general arrangement without departing from the spirit of the invention as defined in the accompanying claims.

I claim as my invention:

1. The combination with a driving member, of a hollow shaft therefor, a flexible shaft having one of its ends, secured to the hollow shaft intermediate the ends thereof, and its other end extending to a point beyond one of the ends of the hollow shaft, a bearing for the hollow shaft, a sleeve member in juxtaposition to said hollow shaft embracing the outer end of the flexible shaft, a gear member carried by the sleeve, and a bearing for the sleeve member.

2. The combination with a driving member, of a hollow shaft therefor, a flexible shaft having one of its ends secured to the hollow shaft intermediate the ends thereof and its other end extending to a point beyond one of the ends of the hollow shaft, a bearing for the hollow shaft, a rotatable support in juxtaposition to said hollow shaft for the outer end of the flexible shaft, a bearing for the rotatable support, and a gear member secured to the rotatable support.

3. In combination, a hollow shaft, bearings for such shaft adjacent to the ends thereof, a flexible shaft lying partially within the hollow shaft and having its inner end secured to said shaft, a sleeve member for the other end of the shaft, of substantially the same diameter as the hollow shaft, means for securing the last named end of the flexible shaft to the sleeve member, a main bearing for the sleeve member, an auxiliary bearing for the sleeve member, and a gear member carried by the sleeve at a point between the auxiliary and the main bearing.

4. The combination with a pair of hollow shafts, of a flexible shaft disposed therein and secured at its respective ends thereto, and a bearing sleeve adapted to rotatably support the adjacent body portions of said hollow shafts.

In testimony whereof, I have hereunto subscribed my name this 26th day of April 1921.

GEORGE M. EATON.